(12) United States Patent
McConville et al.

(10) Patent No.: US 6,884,390 B1
(45) Date of Patent: Apr. 26, 2005

(54) METHOD AND SYSTEM FOR INHIBITING CORROSION INVOLVING THE TRANSFER OF THIN FILMS

(75) Inventors: Frank McConville, Wellesley, MA (US); Richard Skov, Spencer, MA (US); John R. Pennace, Paxton, MA (US)

(73) Assignee: FLEXcon Company, Inc., Spencer, MA (US)

( * ) Notice: Subject to any disclaimer, the term of this patent is extended or adjusted under 35 U.S.C. 154(b) by 462 days.

(21) Appl. No.: 09/871,460

(22) Filed: May 31, 2001

(51) Int. Cl.$^7$ .................. C23F 11/00; B01J 19/00; A61L 2/00; B32B 33/00; B32B 17/00

(52) U.S. Cl. ............ 422/1; 422/7; 422/8; 422/40; 422/255; 422/292; 422/900; 428/40.1; 428/317.1; 428/409; 428/461

(58) Field of Search ............ 422/1, 7–8, 40, 422/255, 292, 900; 428/40.1, 317.1, 409, 461

(56) References Cited

U.S. PATENT DOCUMENTS

| | | | | |
|---|---|---|---|---|
| 4,071,391 A | * | 1/1978 | Haberstroh et al. | 156/325 |
| 4,716,062 A | | 12/1987 | Klein | 428/36 |
| 5,234,259 A | | 8/1993 | Nishimuro et al. | 301/64.7 |
| 5,277,479 A | | 1/1994 | Koyama et al. | 301/64.7 |
| 5,736,470 A | * | 4/1998 | Schneberger et al. | 442/151 |
| 5,880,692 A | | 3/1999 | Stevens et al. | 342/12 |
| 5,932,299 A | | 8/1999 | Katoot | 427/508 |
| 6,124,044 A | * | 9/2000 | Swidler | 428/500 |
| 6,268,032 B1 | * | 7/2001 | Mertens et al. | 428/40.1 |

* cited by examiner

Primary Examiner—Robert J. Warden, Sr.
Assistant Examiner—Monzer R. Chorbaji
(74) Attorney, Agent, or Firm—Gauthier & Connors, LLP

(57) ABSTRACT

A system and method are disclosed for applying a corrosion inhibiting material to an article. The method includes the steps of depositing a layer of corrosion inhibiting material onto a carrier film, applying the corrosion inhibiting material to the article, and separating the carrier film from the at least a portion of the corrosion inhibiting material. In a preferred embodiment, the corrosion inhibiting material is applied to rotors of disc brakes in new automotive vehicles.

10 Claims, 2 Drawing Sheets

METHOD AND SYSTEM FOR INHIBITING CORROSION INVOLVING THE TRANSFER OF THIN FILMS

BACKGROUND OF THE INVENTION

The invention relates generally to inhibit corrosion on items that are exposed to outdoor weather conditions, and particularly relates to the deterrence of corrosion on newly manufactured or assembled items that are being offered for sale and have not been used.

New automobiles typically include elements that may oxidize if unused, but are left uncoated or untreated for a variety of reasons. For example, disc brake rotors should not be painted or coated as such coating materials may adversely effect the use of the brakes. After an automobile is sold, the frequent use of the automobile is sufficient to prevent rust from developing.

It is an object of the invention to provide a protective material that may easily be applied to items to inhibit corrosion such as by oxidation.

It is also an object of the invention to provide a protective material that may be easily removed from items without adverse effects on the operation of the item.

SUMMARY OF THE INVENTION

A system and method are disclosed for applying a corrosion inhibiting material to an article. The method includes the steps of depositing a layer of corrosion inhibiting material onto a carrier film, applying the corrosion inhibiting material to the article, and separating the carrier film from the at least a portion of the corrosion inhibiting material. In a preferred embodiment, the corrosion inhibiting material is applied to rotors of disc brakes in new automotive vehicles.

BRIEF DESCRIPTION OF THE DRAWINGS

The following detailed description of the illustrated embodiments may be further understood with reference to the accompanying drawings in which.

The drawings are for illustrative purposes only and are not to scale.

DETAILED DESCRIPTION OF THE ILLUSTRATED EMBODIMENTS

The invention provides for the application of a thin film of corrosion inhibiting material to a receiving substrate, such as a brake rotor of a vehicle. The thin corrosion inhibiting material may be applied by thin film transfer, and may be removed simply by using the brakes of the vehicle a relatively small number of times.

Figure 1:
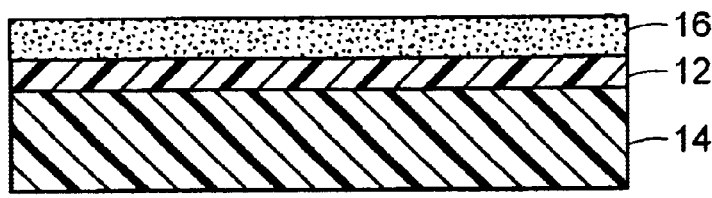
FIG. 1 shows a protective composite in accordance with an embodiment of the invention including a corrosion inhibiting material and a carrier substrate prior to application to a receiving substrate.

As shown in FIG. 1, a protective composite 10 in accordance with an embodiment of the invention includes a corrosion inhibiting material 12 on one side of a carrier film 14 such as a 1 mil film of polyethylene terephthalate (PET). In other embodiments, films made of other materials such as polyolefin or polyamide etc. may be used, and the thickness may be other than 1 mil. The corrosion inhibiting material 12 may be coated onto the carrier, extrusion coated onto the carrier, deposited onto the carrier by calendaring or applied to the carrier by any other method. Coated paper (such as cast coated or extrusion coated paper) may also be useful as a carrier. The composition and thickness of a given carrier is related to the method of manufacturing the corrosion-inhibiting composite, and is related to the method of applying the composite to a substrate to be protected from corrosion. For example, dimensional stability facilitates hand application of the composite to flat article surfaces, while flexibility may facilitate application of the composite to non-flat surfaces.

A layer 16 of adhesive material is then applied to the corrosion inhibiting material 12 by, for example, coating. The adhesive material may be deposited to 0.1–4.0 ml, and may be pressure sensitive adhesive, for example having a Lewis base such as a long chain amine, e.g., dodecyl amine, at 0.05% to 5.0%. If the adhesive is pressure sensitive, the composite may further include a silicone release liner, and if the adhesive is heat activated, no release agent may be needed.

Figure 2:
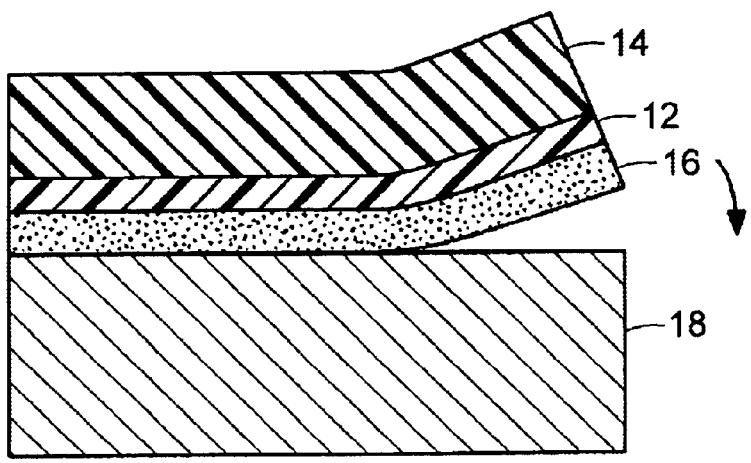
FIG. 2 shows the protective composite of FIG. 1 applied to a receiving substrate.
Figure 3:
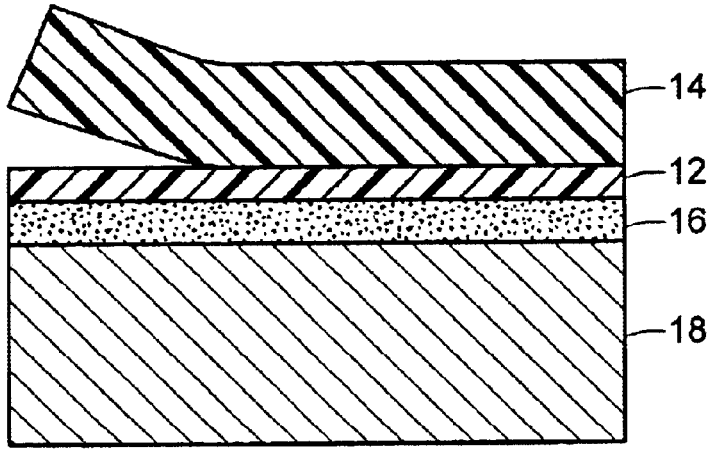
FIG. 3 shows the corrosion inhibiting material of FIG. 1 applied to a receiving substrate with the carrier substrate removed.

As shown in FIG. 2, the adhesive side of the protective composite 10 is applied to a receiving substrate 18, and as shown in FIG. 3, the carrier substrate 14 may then be removed from the corrosion inhibiting material 12 since the layer of adhesive 16 will cause the corrosion inhibiting 12 to remain with the receiving substrate 18. The materials should be chosen such that the bond of the adhesive to the corrosion inhibiting material 12, as well as the bond of the adhesive to a receiving substrate, are stronger than the bond of the corrosion inhibiting material 12 to the carrier 14.

The thickness of the corrosion inhibiting material should be chosen to permit a relatively small number of uses of the brakes without the corrosion inhibiting material from being worn off of the brake rotors. The material, on the other hand, should also not be too thick that it inhibits safe use of the brakes.

The carrier 14 may also include a non-stick surface on the side opposite the corrosion inhibiting material. The non-stick surface may include a silicone coating such as polysiloxane. This silicone coating may serve as a release liner for the adhesive if the protective composite includes an extended web of material that is rolled upon itself prior to application of portions of the composite to a receiving surface.

The corrosion inhibiting material may also be specifically selected for specific applications, such as simply to keep water off the surface of the receiving substrate, to reduce the electrochemical effect that occurs in a galvanic reaction through use of a conductor, to prevent oxidation by changing surface chemistry, or to change the pH to inhibit electrochemical responses, for example from an acidic environment to an alkali environment. In further embodiments, two or more anti-corrosive agents may be used as the corrosion inhibiting material.

For example, a protective composite in accordance with a further embodiment of the invention includes a corrosion inhibiting material that includes 0.05 to 15% (by weight), of a volatile corrosion inhibitor such as DAUBERT VCI sold by Daubert Coated Products, Inc. of Westchester, Ill. Such materials provide corrosion protection by permitting condensed vapor to migrate to the metal surface excluding water. Although these materials work best when the metal is contained, the materials actually provide some protection to the surfaces of the metal that are not directly covered by the corrosion inhibiting material, including side edges, non-perfect alignment of the protective composite, or scratches in the corrosion inhibiting material. This is achieved by adding a conductive polymer to the adhesive. When in contact with the metal, the conductive polymer lowers the redox potential of the metal. A protective oxide layer is formed on the receiving surface, reducing the rate of corrosion by up to 400 times. The effect of conductive polymers allows for protection to extend beyond the area directly covered so that the receiving substrate is protected even if the coating is not continuous, for example, due to scratches.

Figure 4:
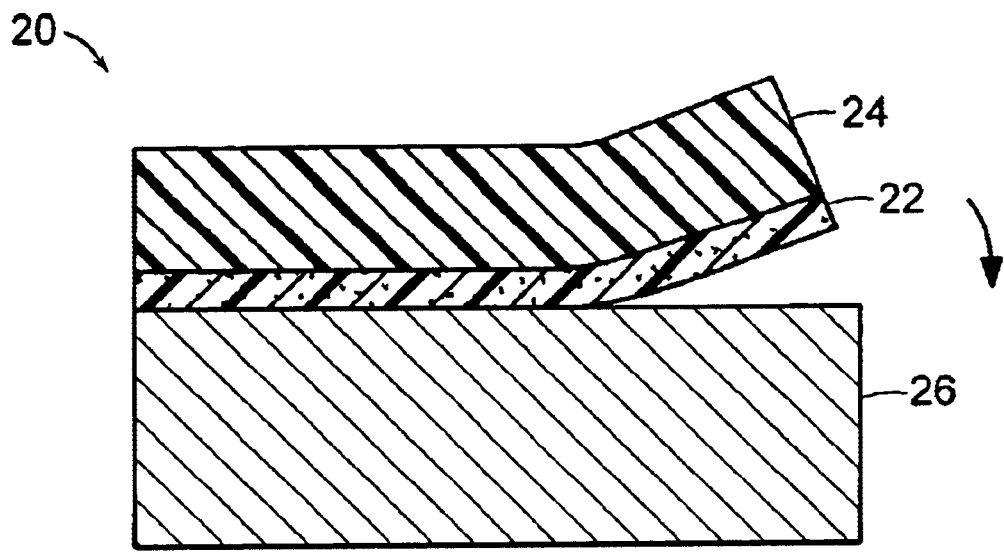
FIG. 4 shows a protective composite in accordance with another embodiment of the invention applied to a receiving substrate.
Figure 5:
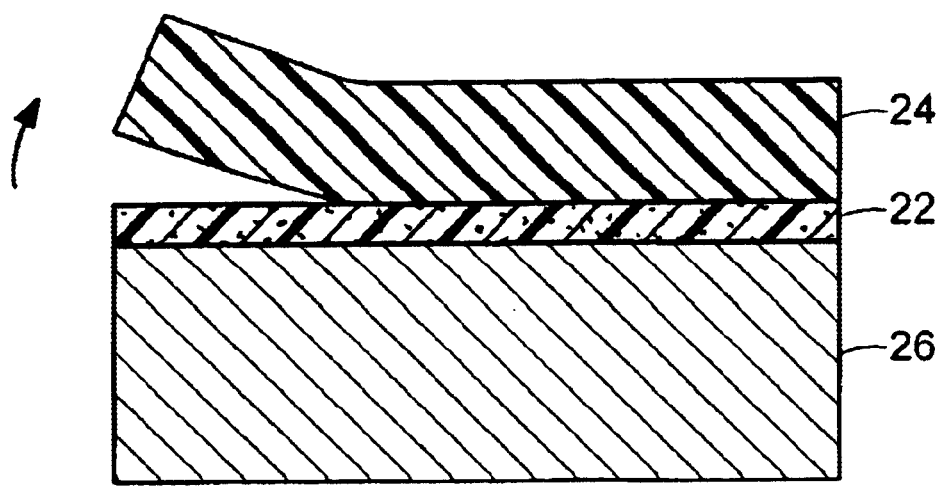
FIG. 5 shows the corrosion inhibiting material of FIG. 4 applied to a receiving substrate with the carrier substrate removed.

As shown in FIG. 4, a protective composite 20 in accordance with a further embodiment of the invention includes a corrosion inhibiting material 22 that is applied to a carrier 24. In this example, the corrosion inhibiting material 22 includes adhesive properties, and may be applied to a receiving substrate 26 without the use of an additional adhesive material. Materials such as polyethylene/acrylic acid copolymers or vinyl acetates or vinyl-oxalates, or ethylene vinyl acetates etc. may be employed as the corrosion inhibiting material.

Those skilled in the art will appreciate that modifications and variations may be made to the above disclosed embodiments without departing from the spirit and scope of the invention.

What is claimed is:

1. A method of applying a corrosion inhibiting material to an article, said method comprising the steps of depositing a layer of corrosion inhibiting material onto a carrier film;

depositing a layer of an adhesive onto said layer of corrosion inhibiting material to form a transferable substrate;

applying said transferable substrate to said article; and separating said carrier film from said transferable substrate.

2. A method as claimed in claim 1, wherein said corrosion inhibiting material has a thickness in the range of about 0.01 mils to about 6.0 mils.

3. A method as claimed in claim 1, wherein said transferable substrate has a thickness in the range of about 0.11 mils to about 10.0 mils.

4. A method as claimed in claim 1, wherein said transferable substrate is in the shape of a brake disc rotor.

5. A method as claimed in claim 1, wherein said corrosion inhibiting material includes a volatile corrosion inhibitor material.

6. A method of applying a corrosion inhibiting material to an article, said method comprising the steps of depositing a layer of corrosion inhibiting material onto a carrier film;

applying said corrosion inhibiting material to the article; and separating said carrier film from at least a portion of said corrosion inhibiting material.

7. A method as claimed in claim 6, wherein said corrosion inhibiting material includes a conductive polymer.

8. A method as claimed in claim 7, wherein said corrosion inhibiting material includes a polyethylene/acrylic acid copolymer.

9. A method as claimed in claim 6, wherein said method further includes the step of depositing a layer of adhesive material on said layer of corrosion inhibiting material prior to the step of applying said corrosion inhibiting material to the article.

10. A method as claimed in claim 6, wherein said corrosion inhibiting material includes adhesive properties, such that the bond between the corrosion inhibiting material and the article is greater than the bond of the corrosion inhibiting material and said carrier film.

* * * * *